US009605411B2

(12) United States Patent
Wen et al.

(10) Patent No.: US 9,605,411 B2
(45) Date of Patent: Mar. 28, 2017

(54) BRAKE CHARGE VALVE WITH SET MINIMUM FIXED HYDRO-MECHANICAL PRESSURE BY-PASS FUNCTION

(71) Applicant: Caterpillar Inc., Peoria, IL (US)

(72) Inventors: Gang Wen, Champaign, IL (US); Moses I. Akpan, Channahon, IL (US); Steven E. Johnson, Crest Hill, IL (US)

(73) Assignee: Caterpillar Inc., Peoria, IL (US)

( * ) Notice: Subject to any disclaimer, the term of this patent is extended or adjusted under 35 U.S.C. 154(b) by 156 days.

(21) Appl. No.: 14/498,310

(22) Filed: Sep. 26, 2014

(65) Prior Publication Data

US 2016/0090715 A1 Mar. 31, 2016

(51) Int. Cl.

*E02F 9/22* (2006.01)
*F15B 11/16* (2006.01)
*F15B 13/00* (2006.01)

(52) U.S. Cl.

CPC .......... *E02F 9/2225* (2013.01); *E02F 9/2203* (2013.01); *E02F 9/226* (2013.01); *E02F 9/2217* (2013.01); *E02F 9/2228* (2013.01); *E02F 9/2278* (2013.01); *F15B 11/162* (2013.01); *F15B 13/00* (2013.01); *Y10T 137/2574* (2015.04); *Y10T 137/2605* (2015.04); *Y10T 137/2663* (2015.04)

(58) Field of Classification Search

CPC ......... Y10T 137/2574; Y10T 137/2605; Y10T 137/2657; Y10T 137/2663; E02F 9/2225; F15B 11/162

See application file for complete search history.

(56) References Cited

U.S. PATENT DOCUMENTS 3,334,705 A * 8/1967 Lam ........................ F15B 11/16 137/118.06
4,044,786 A * 8/1977 Yip ....................... F15B 11/162 137/101
4,057,073 A * 11/1977 Adams .................. F15B 11/162 137/118.06
4,192,337 A * 3/1980 Alderson .................. F15B 1/02 137/101
4,454,716 A * 6/1984 Rau ........................ B62D 5/097 60/422
4,470,260 A * 9/1984 Miller ...................... B62D 5/07 137/596.13

(Continued)

*Primary Examiner* — Kevin Murphy

(57) ABSTRACT

A hydraulic circuit includes: a priority valve including a first position and a second position where: the first position includes a first fluid passage and a fixed bypass orifice connected to the first fluid passage; the second position includes a second fluid passage and a variable bypass orifice connected to the second fluid passage. The hydraulic circuit further includes: a first fluid line fluidly connecting the priority valve and a first machine component; a second fluid line fluidly connecting the priority valve and a second machine component; a check valve placed between the priority valve and the second machine component and fluidly connecting the priority valve and the second machine component; an oil passage on the priority valve fluidly connected to one or more machine components other than the first and second machine components; one or more actuators connected to the priority valve; and a control valve communicatively connected to the one or more actuators connected to the priority valve.

16 Claims, 3 Drawing Sheets

(56) References Cited

U.S. PATENT DOCUMENTS

| | | | | |
|---|---|---|---|---|
| 4,556,078 | A * | 12/1985 | Wittren | B62D 5/07 137/101 |
| 5,165,233 | A * | 11/1992 | Betz | F15B 11/162 137/101 |
| 5,782,260 | A * | 7/1998 | Jacobs | B62D 5/07 137/118.02 |
| 6,769,348 | B2 * | 8/2004 | Hudson | E02F 9/2221 60/452 |
| 7,240,486 | B2 | 7/2007 | Huang | |
| 7,430,860 | B2 | 10/2008 | Whitaker et al. | |
| 7,730,722 | B2 | 6/2010 | Williams | |
| 2012/0060942 | A1 | 3/2012 | Costaz | |

* cited by examiner

BRAKE CHARGE VALVE WITH SET MINIMUM FIXED HYDRO-MECHANICAL PRESSURE BY-PASS FUNCTION

TECHNICAL FIELD

This disclosure is directed generally to a hydraulic circuit and, more particularly, to a hydraulic circuit having a priority valve with a fixed bypass orifice.

BACKGROUND

Earthmoving and construction work machines often employ hydraulic systems that provide functionality and control to various aspects of the machines. For example, some work machines employ a hydraulic braking system to control driving speeds and a fan hydraulic drive system that controls machine cooling.

Because each system may have separate flow requirements, the hydraulic systems on some work machines are isolated systems, each having a separate fluid pump. However, providing a separate pump for each separate hydraulic system may be redundant and may be cost prohibitive. In addition, such a system may require additional maintenance and upkeep. To overcome these disadvantages, some work machines combine or integrate certain hydraulic systems.

Even in a combined system, however, one hydraulic system may require different fluid flow parameters than the other and may require different fluid flow arrangements at different times. To address this, some known systems direct fluid from a common pump to one system or the other system using a cut-in/cut-out device. For example, on a conventional work machine having a combined braking system and a combined cooling system, fluid may be directed to the brake system to charge or fill accumulators with fluid. Then, the cut-in/cut-out device may cut-out fluid flow to the braking system and may instead direct fluid to the cooling system.

Such a conventional system combining a braking system and a cooling system is disclosed in U.S. Pat. No. 7,730,722 B2 to Williams ('722). The '722 patent is directed to a hydromechanical transmission (HMT) or hydrostatic transmission (HST) with a bypass valve. The '722 patent discusses adjusting the HMT ratio settings, depending on operator input, deceleration requirements and external loading due to application of brakes and/or terrain. To adjust the HMT ratio, '722 patent discloses a hydrostatic circuit having a first hydraulic kit that is fluidly connected to a second hydraulic kit via first and second fluid lines. The hydraulic circuit in '722 patent additionally has a bypass valve connected in parallel to the first and second hydraulic kits via the first and second fluid lines. The bypass valve is then controlled in such a way that the valve opens when a predetermined condition is met in order to relieve pressure in the hydrostatic circuit. However, the additional bypass valve connected in parallel to the first and second hydraulic kits involves additional costs and requires additional fluid lines which can make the HMT unnecessarily complicated. Moreover, when the bypass valve opens, the torque of the HMT is lowered regardless of the swash plate angle and the speed of the two hydraulic kits, and thus the efficiency of the HMT deteriorates.

As a result, there is a need for a hydraulic circuit fluidly connecting a plurality of machine components without complicating the circuit and losing its efficiency.

SUMMARY

The disclosure is directed to a hydraulic circuit, the hydraulic circuit including: a priority valve including a first position and a second position where: the first position includes a first fluid passage and a fixed bypass orifice connected to the first fluid passage; the second position includes a second fluid passage and a variable bypass orifice connected to the second fluid passage. The hydraulic circuit further includes: a first fluid line fluidly connecting the priority valve and a first machine component; a second fluid line fluidly connecting the priority valve and a second machine component; a check valve placed between the priority valve and the second machine component and fluidly connecting the priority valve and the second machine component; an oil passage on the priority valve fluidly connected to one or more machine components other than the first and second machine components; one or more actuators connected to the priority valve; one or more actuators connected to the second position of the priority valve; and a control valve communicatively connected to the one or more actuators connected to the priority valve.

Another aspect of the disclosure is directed to a method for manufacturing a hydraulic circuit, the method including: preparing a priority valve comprising a first position and a second position, where: the first position comprises a first fluid passage and a fixed bypass orifice connected to the first fluid passage; the second position comprises a second fluid passage and a variable bypass orifice connected to the second fluid passage; configuring a first fluid line to fluidly connect the priority valve and a first machine component; configuring a second fluid line to fluidly connect the priority valve and a second machine component; configuring a check valve to be placed between the priority valve and the second machine component; connecting one or more actuators to the priority valve; and communicatively connecting a control valve to the one or more actuators connected to the priority valve.

Another aspect of the disclosure is directed to an apparatus for a machine, the apparatus including: a priority valve including a first position and a second position, where: the first position includes a first fluid passage and a fixed bypass orifice connected to the first fluid passage; the second position includes a second fluid passage and a variable bypass orifice connected to the second fluid passage; first means for fluidly connecting the priority valve and a first machine component; second means for fluidly connecting the priority valve and a second machine component; means for being placed between the priority valve and the second machine component and fluidly connecting the priority valve and the second machine component; means for actuating the priority valve; and means for communicatively controlling the means for actuating the priority valve.

DETAILED DESCRIPTION OF THE DISCLOSURE

Reference will now be made in detail to exemplary embodiments that are illustrated in the accompanying drawings. Wherever possible, the same reference numbers will be used throughout the drawings to refer to the same or like parts. While specific configurations and arrangements are discussed, it should be understood that this is done for illustrative purposes only.

Figure 1:
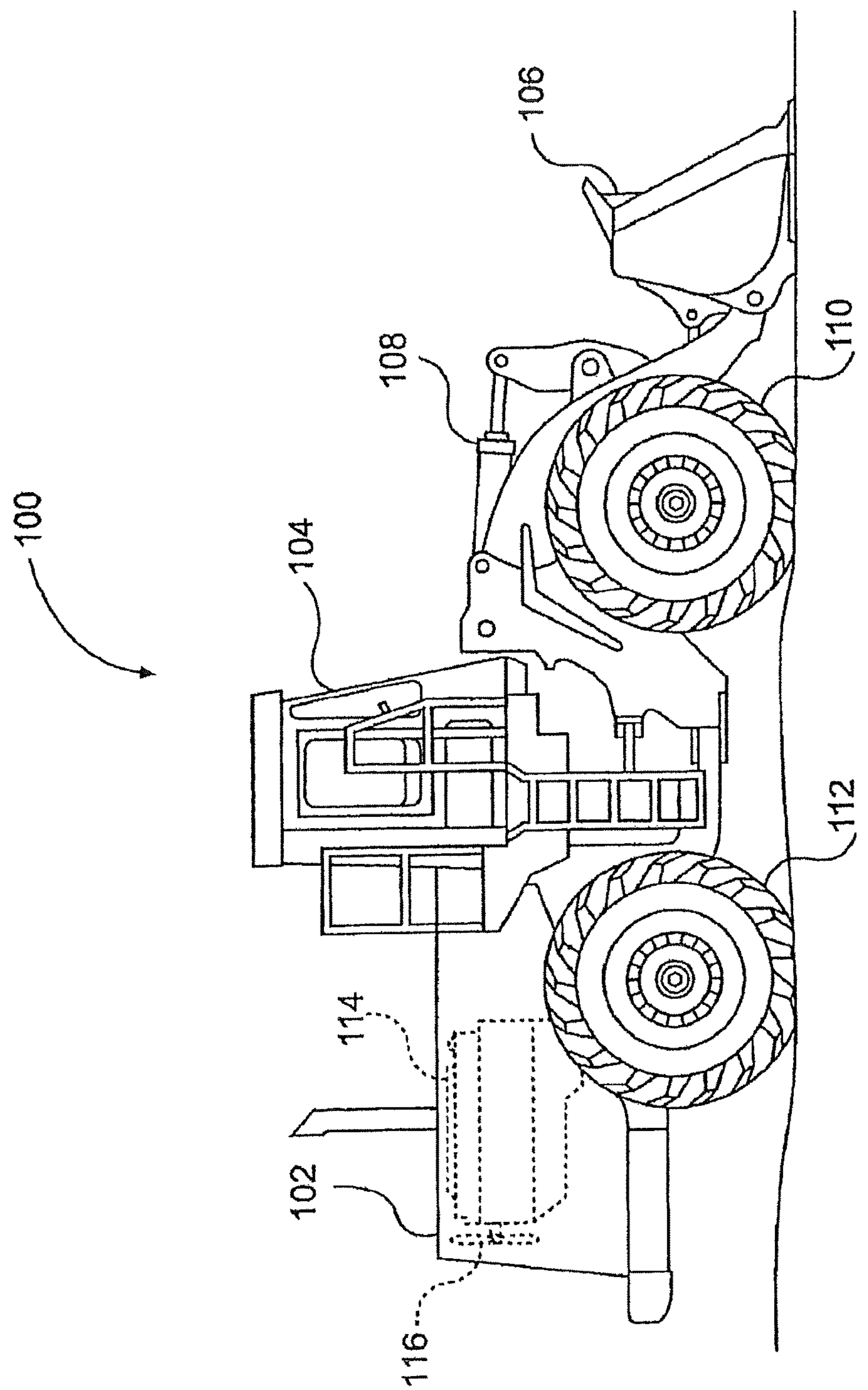
FIG. 1 is a pictorial illustration of an exemplary disclosed machine.

FIG. 1 shows an exemplary work machine 100 that incorporates a hydraulic circuit 200 (shown in FIG. 2) as disclosed herein. The work machine 100 may include an engine housing 102, an operator station 104, and a work implement 106 for digging and load material. In the example of work machine 100 being a wheel loader, the work implement 106 may be powered and controlled by a number of actuators including a tool actuator 108. The work machine 100 may include front and rear ground engaging devices, such as front wheels 110 and rear wheels 112 that support the work machine 100.

The engine housing 102 may include a power source 114 such as an engine, and a hydraulically-driven cooling fan. The power source 114 may provide power to the front and/or rear wheels 110, 112. The cooling fan system 116 may form part of a cooling system configured to draw or push air through a heat exchanger and/or provide convective cooling to the power source 114.

In addition, the work machine 100 may include a brake charging system (shown in FIG. 3) operable to resist movement of the work machine 100. The brake charging system may be associated with the wheels 110, 112 and may be operable from input devices within the operator station 104. The brake charging system and the cooling fan system 116 may be fluidly connected to a hydraulic circuit 200 (shown in FIG. 2).

One example of the hydraulic circuit 200 fluidly connected within the work machine 100 is disclosed in and described with reference to FIG. 2. The hydraulic circuit 200 may include one or more of a valve actuator 281, 282, an elastic actuator 283, a priority valve 210, a control valve 260, a check valve 270, an oil passage 290 and a fluid line 240, 250. The hydraulic circuit 200 may be placed among a plurality of machine components such as a power source, a brake accumulator, a pump, a fluid reservoir, a tank, a tool actuator, and any type of device requiring a hydraulic function. The hydraulic circuit 200 may be in fluid communication directly/indirectly with one or more of the machine components.

The priority valve 210 may be configured to establish a fluid communication between a first machine component 201 and a second machine component 202. In one aspect, the first machine component 201 may be a source of hydraulic power and the second machine component 202 may be a device requiring a hydraulic function. The first machine component 201 may be fluidly connected to the priority valve 210 by a first fluid line 240. The second machine component 202 may be fluidly connected to the priority valve 210 by a second fluid line 250.

The priority valve 210 may include a first position 220. The first position 220 may include a first fluid passage 221. The first fluid line 240 and the second fluid line 250 may be fluidly connected by the first fluid passage 221 to establish a fluid connection between the first machine component 201 and the second machine component 202. The fixed bypass orifice 222 may drain some pressure oil on the first fluid passage 221 to maintain a preset fluid pressure in the second fluid line 250 and subsequently in the second machine component 202.

The fixed bypass orifice 222 may be configured to direct fluid to one or more machine components 203 other than the second machine component 202. The fixed bypass orifice 222 may be fluidly connected to an oil passage 290. The oil passage 290 may be fluidly connected to one or more machine components 203 other than the second machine component 202. Optionally, the oil passage 290 may be fluidly connected to a third fluid line 291 extended from the machine components 203 other than the first machine component 201 and the second machine component 202.

The priority valve 210 may be placed in the first position 220 when a level of hydraulic function of the second machine component 202 is below a pre-determined threshold fluid pressure. The level of hydraulic function of the second machine component 202 may be determined by a fluid pressure in the second fluid line 250. In one aspect, the level of hydraulic function of the second machine component 202 may be determined by a fluid pressure at P4 in the second fluid line 250. The fixed bypass orifice 222 may direct fluid to the machine components 203 when a fluid pressure in the first fluid line 240 is higher than the pressure of the machine components 203. The amount of flow may depend on the size of the fixed bypass orifice 222 and the pressure at the first fluid line 240.

The priority valve 210 may include a second position 230 that abuts the first position 220 to adjust excess fluid flow to the machine components 203. The second position 230 may include a second fluid passage 231 capable of supplying fluid to the second fluid line 250 and subsequently to the second machine component 202. The second fluid passage 231 may be connected to a variable bypass orifice 232 to adjust excess fluid flow to the machine components 203. In one aspect, the variable bypass orifice 232 may increase or decrease fluid flow to the machine components 203. In some aspects, the variable bypass orifice 232 may prevent fluid from flowing toward the machine components 203. In some aspects, the cross-sectional dimension of the fixed bypass orifice 222 may be smaller than the cross-sectional dimension of the variable bypass orifice 232.

The variable bypass orifice 232 may be configured to direct fluid to one or more machine components 203 other than the second machine component 202. One end of the variable bypass orifice 232 may be connected to the second fluid passage 231, and the other end of the variable bypass orifice 232 may be fluidly connected to the oil passage 290. The oil passage 290 may be fluidly connected to one or more machine components 203 other than the second machine component 202. Optionally, the oil passage 290 may be fluidly connected to a third fluid line 291 extended from one or more machine components 203.

The priority valve 210 may be in the form of valve spool 211 configured to shift between the first position 220 and the second position 230 under the effects of an elastic actuator 283, a first valve actuator 281, and a second valve actuator 282. The elastic actuator 283 and the first valve actuator 281 may be connected to the first position 220 whereas the second valve actuator 282 may be connected to the second position 230.

The hydraulic circuit 200 may include a control valve 260 communicatively connected to the first valve actuator 281 and the second valve actuator 282. The first valve actuator 281 may be connected to the control valve 260 by a first control line 261, and the second valve actuator 282 may be connected to the first fluid line 240. The control valve 260 may be configured to determine or limit a fluid pressure in the second fluid line 250. Depending on the determined fluid pressures, the control valve 260 may send a signal to the first valve actuator 281 so that the first valve actuator 281, the second valve actuator 282 and the elastic actuator 283 can move the priority valve 210 to the first position 220 or the second position 230 as desired. The signal from the control valve 260 may be a hydraulic signal.

The hydraulic circuit 200 may include a check valve 270. The check valve 270 may be located between the second machine component 202 and the priority valve 210. In one aspect, the check valve 270 may be a non-return valve to prevent fluid from flowing from the second machine component 202 toward the priority valve 210.

Figure 3:
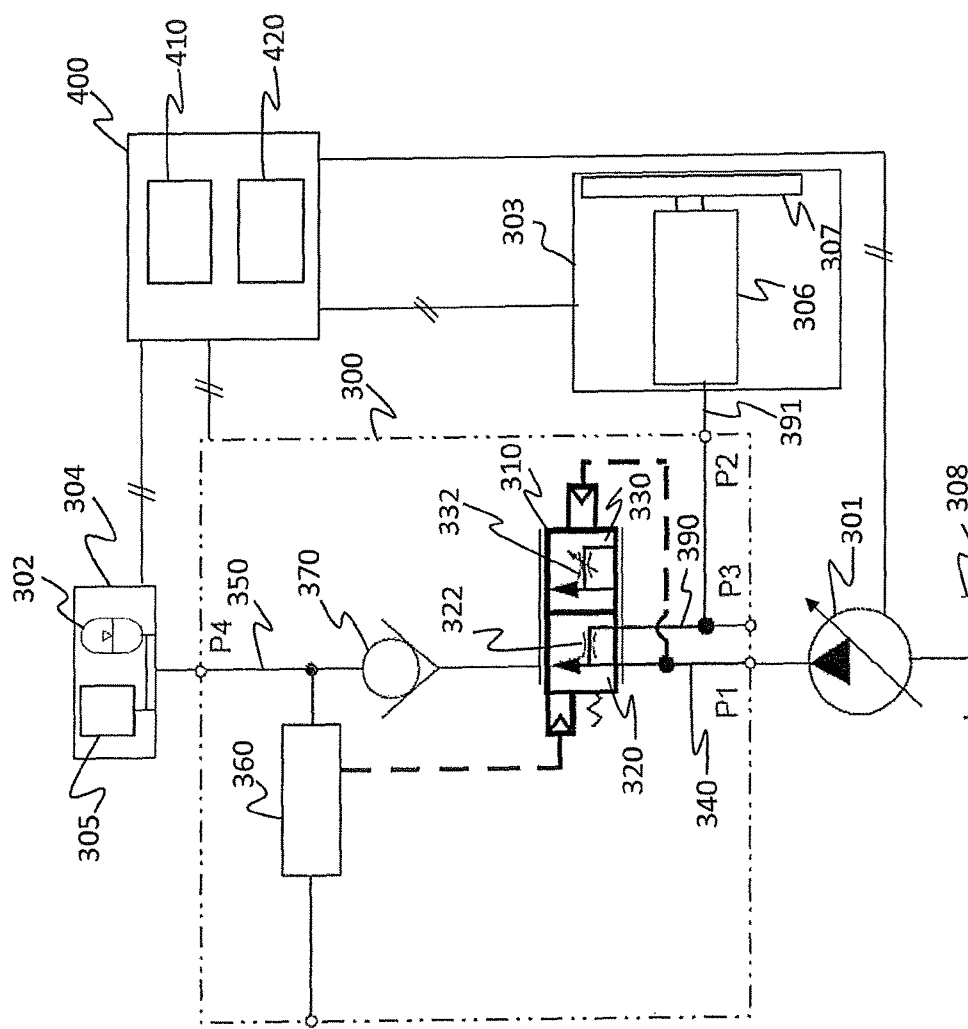
FIG. 3 is a schematic and diagrammatic illustration of an exemplary disclosed hydraulic circuit connected to a brake charging system, a fan driving system and a hydraulic pump for use with the machine of FIG. 1.

FIG. 3 is another exemplary hydraulic circuit 300 connected to a hydraulic pump 301, a brake charging system 304 and a fan driving system 303 in the work machine 100 (shown in FIG. 1). The brake charging system 304 may include a brake actuator 305 and a brake accumulator 302. The fan driving system 303 may include a fan 307 and a fan motor 306.

The first machine component connected to the hydraulic circuit 300 may be the hydraulic pump 301. The hydraulic pump 301 may be connected to draw fluid from a tank 308 and to pressurize the fluid to a pre-determined level. The hydraulic pump 301 may be connected to power source by, for example, a coupling, belt, clutch, or in any other suitable manner, such that an output rotation of power source results in a pumping action of the hydraulic pump 301. Alternatively, the hydraulic pump 301 may be connected indirectly to power source via a torque converter, a gear box, or in any other manner known in the art. The hydraulic pump 301 may discharge fluid through a discharge outlet and the first fluid line 340 to the priority valve 310 in the hydraulic circuit 300. It is contemplated that multiple sources of fluid may be interconnected to supply fluid to the hydraulic circuit 300, if necessary.

The hydraulic pump 301 may be a fixed displacement pump such as gear pump, or a variable displacement pump having a swash plate configured to vary the stroke of one or more pistons (not shown) associated with the hydraulic pump 301, thereby varying the output displacement of the hydraulic pump 301. By varying the angle of swash plate, pump flow may be increased or decreased, as desired.

The second machine component connected to the hydraulic circuit 300 may be the brake charging system 304. In one aspect, the hydraulic circuit 300 may be fluidly connected to the brake accumulator 302 as the second machine component. Each of the wheels of the work machine 100 may be associated with a respective brake actuator 305. The brake actuator 305 may be configured to actuate a hydraulic pressure-actuated wheel brake such as, for example, a disk brake or a drum brake associated with the wheel, and a drive assembly (not shown for clarity) of the work machine 100. The brake actuator 305 may be operated in a known manner, such as by a brake pedal disposed within the operator cab of the work machine 100. The brake actuator 305 also may be integrated with axels or other drive train components of the work machine 100.

The brake actuator 305 may be fluidly connected to the brake accumulator 302. The brake accumulator 302 may be configured to hold a supply of pressurized fluid at a desired pressure and to supply the desired pressure to the brake actuator 305 to slow or stop movement of the work machine 100. For example, the fluid level in the brake accumulator 302 may be maintained above a pre-established threshold level in order to provide a brake pressure when desired by a work machine operator.

The control valve 360 may be configured to detect when fluid pressure being fed to the brake accumulator 302 drops below the pre-established threshold level. A check valve 370 may be placed between the brake accumulator 302 and the priority valve 310 to prevent circulation of the hydraulic fluid from the brake accumulator 302 to the priority valve 310.

The fixed bypass orifice 322 and/or the variable bypass orifice 332 in the priority valve 310 may be fluidly connected to the fan driving system 303. The fan motor 306 of the fan driving system 303 may be associated with and configured to power the fan 307. Powered by fluid by the fluid source, the fan motor 306 may be configured to rotate the fan 307 to draw or push air across the power source or across a heat exchanger (not shown). The flow rate of pressurized fluid through the fan motor 306 may correspond to and drive the rotational speed of the cooling fan 307. The oil passage 390 may be connected to the fan driving system 303. Optionally, the third fluid line 391 may be connected to the fan driving system 303. In one aspect, the fixed bypass orifice 322 and/or the variable bypass orifice 332 may be fluidly connected to the fan driving system 303 and/or one or more machine components other than the brake charging system 304.

The priority valve 310 may be configured to provide fluid to both the brake charging system 304 and the fan driving system 303. In order to ensure that pressure is continuously available to the brake charging system 304, the priority valve 310 may be configured to give priority of fluid flow to the brake charging system 304 over the fan driving system 303. In other words, the priority valve 310 may be configured to direct fluid to the brake charging system 304 anytime there is a fluid demand on the brake charging system 304.

The priority valve 310 may be configured to be positioned at either the first position 320 or the second position 330, depending on an engine condition and/or a hydraulic level in the brake accumulator 302. When the work machine 100 is powered off or the hydraulic pump 301 is not operating, the priority valve 310 may be biased to the first position 320. When the work machine 100 is then powered on, the hydraulic pump 301 may become active, providing fluid to the priority valve 310. Typically, during a start-up state, the fluid may be directed through the first position 320 of the priority valve 310 to the brake charging system 304. When the brake accumulator 302 is fully charged, the fluid pressure may shift the priority valve 310 to the second position 330.

When the priority valve 310 is positioned at the second position 330, fluid may be directed toward the brake charging system 304 and/or the fan driving system 303. In one aspect, the second position 330 may direct fluid to both the brake charging system 304 and the fan driving system 303. The variable bypass orifice 332 in the second position 330 may adjust flow to provide a desired flow ratio between the brake charging system 304 and the fan driving system 303. In some aspects, the second position 330 may direct flow only to the fan driving system 303 when there is no demand for fluid at the brake charging system 304.

The work machine 100 may include a control system 400. The control system 400 may monitor and adjust the performance of the work machine 100 and its components. The control system 400 may include a plurality of sensors 410 and a controller 420. The sensors 410 may provide information to the controller 420 that may be used to monitor and adjust the performance of the work machine 100. The sensors 410 may be placed in various locations in the work machine 100. The sensors 410 may communicate measurement values to the controller 420 and the controller 420 may use the information from the sensors 410 in any combination to monitor and adjust the performance of the work machine 100 and its components.

The controller 420 may embody a single microprocessor or multiple microprocessors that include a means for controlling an operation of the work machine 100. Numerous commercially available microprocessors can be configured to perform the functions of the controller 420, and it should be appreciated that the controller 420 could readily embody an Engine Control Module (ECM) and/or a general machine processor capable of controlling numerous machine functions. The controller 420 may include a memory, a secondary storage device, a processor, and any other components for running an application. Various other circuits may be associated with the controller 420, such as power supply circuitry, signal output circuitry, signal amplification circuitry, and other types of circuitry known in the art.

It is also considered that the controller 420 may include one or more maps stored within an internal memory of the controller. Each of these maps may include a collection of data in the form of tables, graphs, and/or equations. In one aspect, these maps may correlate with selectable modes of operation, such as a normal mode, a start-up mode, and a neutral mode. Each mode map may include information that may be used to control various components of the hydraulic circuit 300 based on a specific mode of operation (i.e. normal, start-up, or neutral). Each mode map may include data that may be used to control the position and operation of the work machine 100 including the hydraulic circuit 300. The mode may be selected manually by an operator or automatically by the controller 420 based on the inputs from the sensors and/or the operator.

INDUSTRIAL APPLICABILITY

Figure 2:
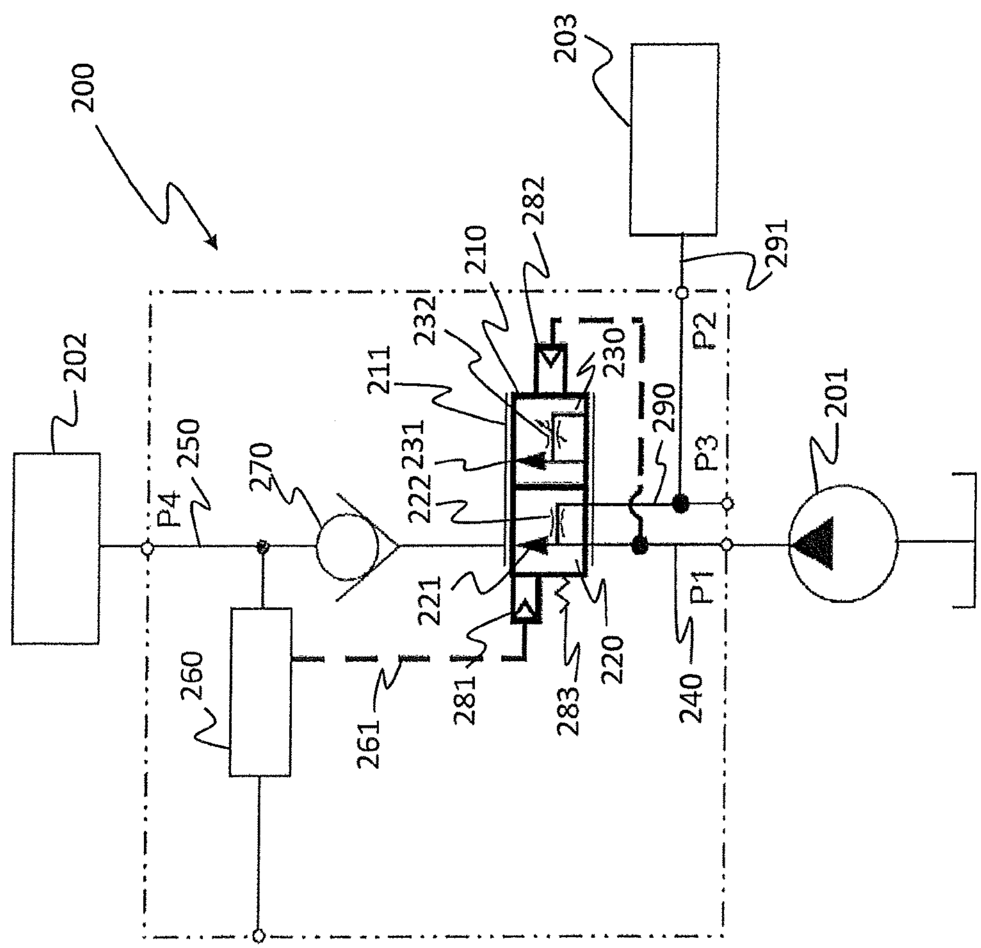
FIG. 2 is a schematic and diagrammatic illustration of an exemplary disclosed hydraulic circuit for use with the machine of FIG. 1.

The hydraulic circuit 200 described herein as in FIG. 2 may employ the priority valve 210 that direct fluid to the second machine component 202 to maintain a desired hydraulic level of the second machine component 202. In one exemplary embodiment, the priority valve 210 may be configured to maintain fluid pressure in the second machine component 202. The priority valve 210 may include the first position 220 to supply fluid to the second machine component 202 and the second position 230 to direct excess flow to the machine components 203 for other functions (e.g., fan driving system).

During a start-up state, when fluid is cold and highly viscous, a hydraulic pump may cause a high torque load to an engine. To alleviate the high torque, in conventional systems, an electro-hydraulic bypass valve is generally provided to direct fluid to a tank. However, the electro-hydraulic bypass valve involves additional costs and fluid lines that can negatively affect the reliability of a brake charging system.

In contrast, instead of employing a separate electro-hydraulic bypass valve, the priority valve 210 of the hydraulic circuit 200 may employ a fixed bypass orifice 222 in the first position 220 and a variable bypass orifice 232 in the second position 230. The fixed bypass orifice 222 may allow flow to one or more machine components 203 other than the second machine component 202 when a fluid pressure in the first fluid line 240 is higher than the pressure of the machine components 203, which may ease the torque load on an engine during the start-up state.

As shown in FIG. 3, an exemplary description of the operation of the hydraulic circuit 300 is now provided. When the work machine 100 is powered off, meaning that the fluid source is not operating, the priority valve 310 may be biased to the first position 320. In one aspect, the work machine 100 may require fluid pressure at the brake accumulator 302 drained out. When the work machine 100 is powered on, the hydraulic pump 301 may become active, providing fluid to the priority valve 310. During an early stage of start-up, when a fluid pressure in the first fluid line 340 rises, the fluid may be directed to the check valve 370 and also directed to the fan driving system 303. When the fluid pressure in the first fluid line 340 is below the pre-charge pressure of the brake accumulator 302 (in a term as "charge threshold"), fluid may fill in to the check valve 370 and the second fluid line 350 only, but the fluid pressure may be too low to charge the brake accumulator 302. The fixed bypass orifice 322 may drain a small amount of flow to the fan driving system 303 which either drives the fan motor 306 to rotate at a low fluid pressure, or even is further by-passed by an additional start up valve (not shown) to the fan motor 306. All these downstream low pressure cases may add low load pressure to the hydraulic pump 301, so the hydraulic pump 301 can start at low discharge pressure or with low torque. When a pump speed increases, the fluid pressure in the first fluid line 340 increases. Once the fluid pressure in the first fluid line 340 exceeds the "charge threshold" pressure, the fluid pressure may open the check valve 370 and majority of fluid in first fluid line 340 may charge the brake accumulator 302, at the same time, the fixed bypass orifice 322 may drain some oil to the fan driving system 303, if necessary.

The control valve 360 may direct fluid to the priority valve 310 when the brake accumulator 302 becomes fully charged, and pressure at the priority valve 310 may shift the position of the priority valve 310 to the second position 330. The status of the hydraulic circuit 300 may shift from the start-up operation to normal "Cut-Out" operation. The flow to the brake accumulator 302 may be adjustably controlled by the variable bypass orifice 332 in the second position 330. In one aspect, as long as there is no drain on the brake accumulator 302, the variable bypass orifice 332 may direct flow entering the priority valve 310 only to the fan driving system 303.

When the brake actuator 305 is used, pressure in the brake accumulator 302 may decrease, causing a decrease in the pressure at the priority valve 310. Then, the variable bypass orifice 332 may direct flow entering the priority valve 310 partially or fully to the brake accumulator 302 as desired. Even while providing fluid to the brake charging system 304, the variable bypass orifice 332 may be capable of partially directing fluid to the fan driving system 303. Accordingly, both the brake charging system 304 and the fan driving system 303 may be simultaneously provided with fluid flow. Alternatively, at a reduction in pressure at the brake accumulator 302, the priority valve 310 may responsively shift to minimize any drain from the brake accumulator 302, thereby maintaining a substantially constant fluid level within the brake accumulator 302. In one aspect, a fluid pressure at P4 in the second fluid line 350 may be different from a fluid pressure at P3 or P2 in the oil passage 390 during the normal operation.

Although the hydraulic circuit 300 is discussed with reference to the work machine 100, the principles and system described herein are equally applicable to any machine having fluid-driven cooling and braking systems. Further, even though the hydraulic circuit 300 describes a two position priority valve 310, the priority valve 310 could be any valve operable to maintain one or more machine components at a substantially constant fluid level or operable to induce flow-sharing between the one or more machine components.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A hydraulic circuit for a machine, comprising:

a priority valve;

a first fluid line fluidly connecting the priority valve and a first machine component;

a second fluid line fluidly connecting the priority valve and a second machine component;

an oil passage fluidly connecting the priority valve and one or more machine components other than the first and second machine components;

a check valve placed between the priority valve and the second machine component and fluidly connecting the priority valve and the second machine component;

the priority valve including a valve spool configured to shift between a first position and a second position of the priority valve;

the first position of the priority valve including a first fluid passage and a fixed bypass orifice connected to the first fluid passage, the first fluid passage fluidly connecting the first fluid line and the second fluid line and configured to establish a fluid connection between the first machine component and the second machine component when the priority valve is in the first position, and the fixed bypass orifice connected to the oil passage and configured to direct fluid to the one or more machine components other than the first and second machine components when the priority valve is in the first position;

the second position of the priority valve including a second fluid passage and a variable bypass orifice, the variable bypass orifice having a first end connected to the second fluid passage and a second end, the second fluid passage fluidly connecting the first fluid line and the second fluid line when the priority valve is in the second position, and the second end of the variable bypass orifice connected to the oil passage such that the variable bypass orifice is configured to direct fluid to the one or more machine components other than the first and second machine components when the priority valve is in the second position;

wherein the variable bypass orifice is configured to adjustably control the flow of fluid to one or more of increasing, decreasing, and preventing fluid flow to the one or more machine components other than the first and second machine components when the priority valve is in the second position;

one or more actuators connected to the priority valve and configured to shift the priority valve between the first position and the second position; and a control valve communicatively connected to the one or more actuators connected to the priority valve.

2. The hydraulic circuit according to claim 1, wherein the priority valve is configured to shift between the first position and the second position as a function of fluid pressure in at least one of the first fluid line and the second fluid line.

3. The hydraulic circuit according to claim 1, wherein the control valve fluidly communicates with the one or more actuators connected to the priority valve.

4. The hydraulic circuit according to claim 1, wherein the priority valve is connected to a hydraulic pump as the first machine component and to one or more brake accumulators as the second machine component.

5. The hydraulic circuit according to claim 4, wherein the fixed bypass orifice of the first position is configured to direct fluid entering the priority valve to the one or more machine components other than the one or more brake accumulators when the fluid pressure entering the priority valve is below a threshold fluid pressure during a start-up state of the machine.

6. The hydraulic circuit according to claim 4, wherein the variable bypass orifice of the second position is configured to direct fluid entering the priority valve to the one or more machine components other than the one or more brake accumulators during normal operation of the machine.

7. The hydraulic circuit according to claim 4, wherein a cross-sectional diameter of the fixed bypass orifice is smaller than a cross-sectional diameter of the variable bypass orifice.

8. The hydraulic circuit according to claim 4, wherein the fixed bypass orifice is fluidly connected to a fan driving system when the priority valve is in the first position.

9. The hydraulic circuit according to claim 4, wherein the variable bypass orifice is fluidly connected to a fan driving system when the priority valve is in the second position.

10. The hydraulic circuit according to claim 4, wherein the fixed bypass orifice is configured to drain fluid from the first fluid passage to maintain a preset fluid pressure in the second fluid line and the one or more brake accumulators.

11. The hydraulic circuit according to claim 4, wherein the priority valve is configured to shift between the first position and the second position as a function of fluid pressure in at least one of the first fluid line and the second fluid line such that when the one or more brake accumulators are fully charged, the fluid pressure in at least one of the first fluid line and the second fluid line shifts the priority valve to the second position.

12. A machine, comprising:

a power source, two or more wheels which support the machine, and a hydraulic circuit, the power source configured to provide power to the two or more wheels, and each of the two or more wheels associated with a brake actuator of the hydraulic circuit;

the hydraulic circuit, comprising;

a hydraulic pump and one or more machine components, the one or more machine components including a brake accumulator and one or more machine components other than the brake accumulator;

a brake charging system including a brake actuator and the brake accumulator;

a priority valve;

a first fluid line fluidly connecting the priority valve and the hydraulic pump;

a second fluid line fluidly connecting the priority valve and the brake accumulator;

an oil passage fluidly connecting the priority valve and the one or more machine components other than the brake accumulator;

a check valve placed between the priority valve and the brake accumulator and fluidly connecting the priority valve and the brake accumulator;

the priority valve including a valve spool configured to shift between a first position and a second position of the priority valve;

the first position of the priority valve including a first fluid passage and a fixed bypass orifice connected to the first fluid passage, the first fluid passage fluidly connecting the first fluid line and the second fluid line and configured to establish a fluid connection between the hydraulic pump and the brake accumulator when the priority valve is in the first position, and the fixed bypass orifice connected to the oil passage and configured to direct fluid to the one or more machine components other than the brake accumulator when the priority valve is in the first position;

the second position of the priority valve including a second fluid passage and a variable bypass orifice, the variable bypass orifice having a first end connected to the second fluid passage and a second end, the second fluid passage fluidly connecting the first fluid line and the second fluid line when the priority valve is in the second position, and the second end of the variable bypass orifice connected to the oil passage such that the variable bypass orifice is configured to direct fluid to the one or more machine components other than the brake accumulator when the priority valve is in the second position;

wherein the variable bypass orifice is configured to adjustably control the flow of fluid to one or more of increasing, decreasing, and preventing fluid flow to the one or more machine components other than the brake accumulator when the priority valve is in the second position;

one or more actuators connected to the priority valve and configured to shift the priority valve between the first position and the second position; and a control valve communicatively connected to the one or more actuators connected to the priority valve.

13. The machine according to claim 12, wherein the priority valve is configured to shift between the first position and the second position as a function of fluid pressure in at least one of the first fluid line and the second fluid line.

14. The machine according to claim 13, wherein the fixed bypass orifice of the first position is configured to direct fluid entering the priority valve to the one or more machine components other than the brake accumulator when the fluid pressure entering the priority valve is below a threshold fluid pressure during a start-up state of the machine.

15. The hydraulic circuit according to claim 13, wherein the second fluid passage of the second position is configured to direct fluid entering the priority valve to the brake accumulator and the variable bypass orifice of the second position is configured to direct fluid entering the priority valve to the one or more machine components other than the brake accumulator during normal operation of the machine.

16. The machine according to claim 12, wherein the priority valve is configured to shift between the first position and the second position as a function of fluid pressure in at least one of the first fluid line and the second fluid line such that when the one or more brake accumulators are fully charged, the fluid pressure in at least one of the first fluid line and the second fluid line shifts the priority valve to the second position.

* * * * *